April 15, 1958  C. A. BRAUCHLER  2,830,474
METHOD OF MAKING AN INSERTED TOOTH CIRCULAR SAW BLADE
Filed June 14, 1954  2 Sheets-Sheet 1
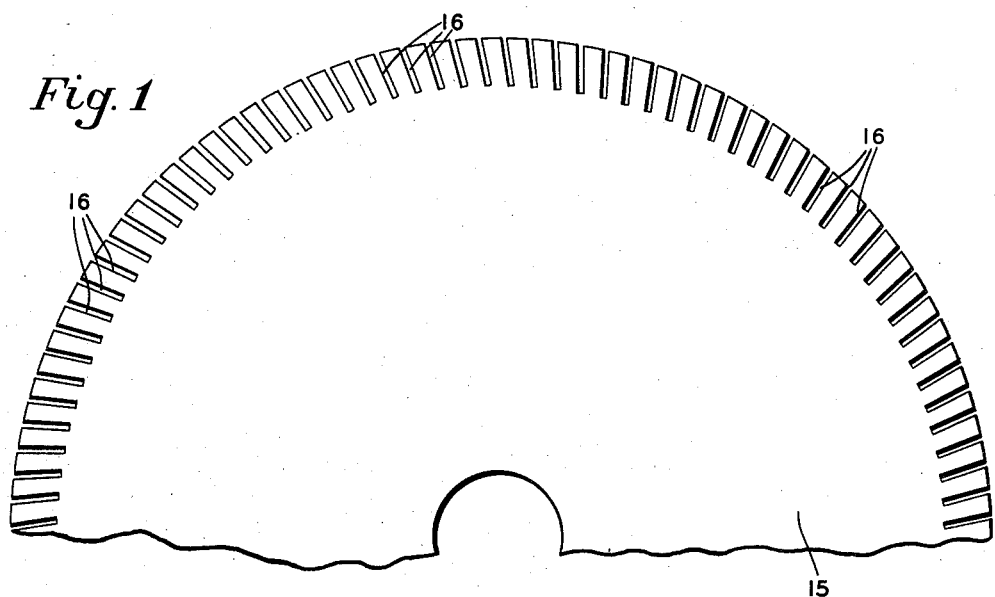
*Fig. 1*
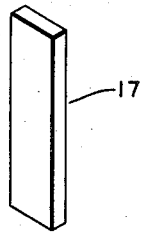
*Fig. 2*
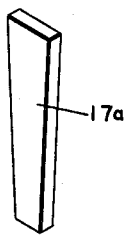
*Fig. 3*
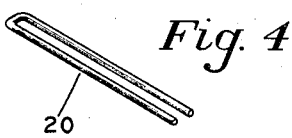
*Fig. 4*
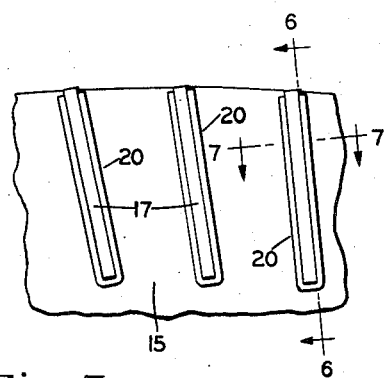
*Fig. 5*
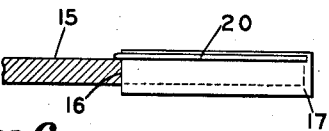
*Fig. 6*
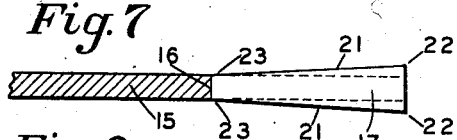
*Fig. 7*
*Fig. 9*
INVENTOR.
Charles A. Brauchler
BY
Frease & Bishop
ATTORNEYS

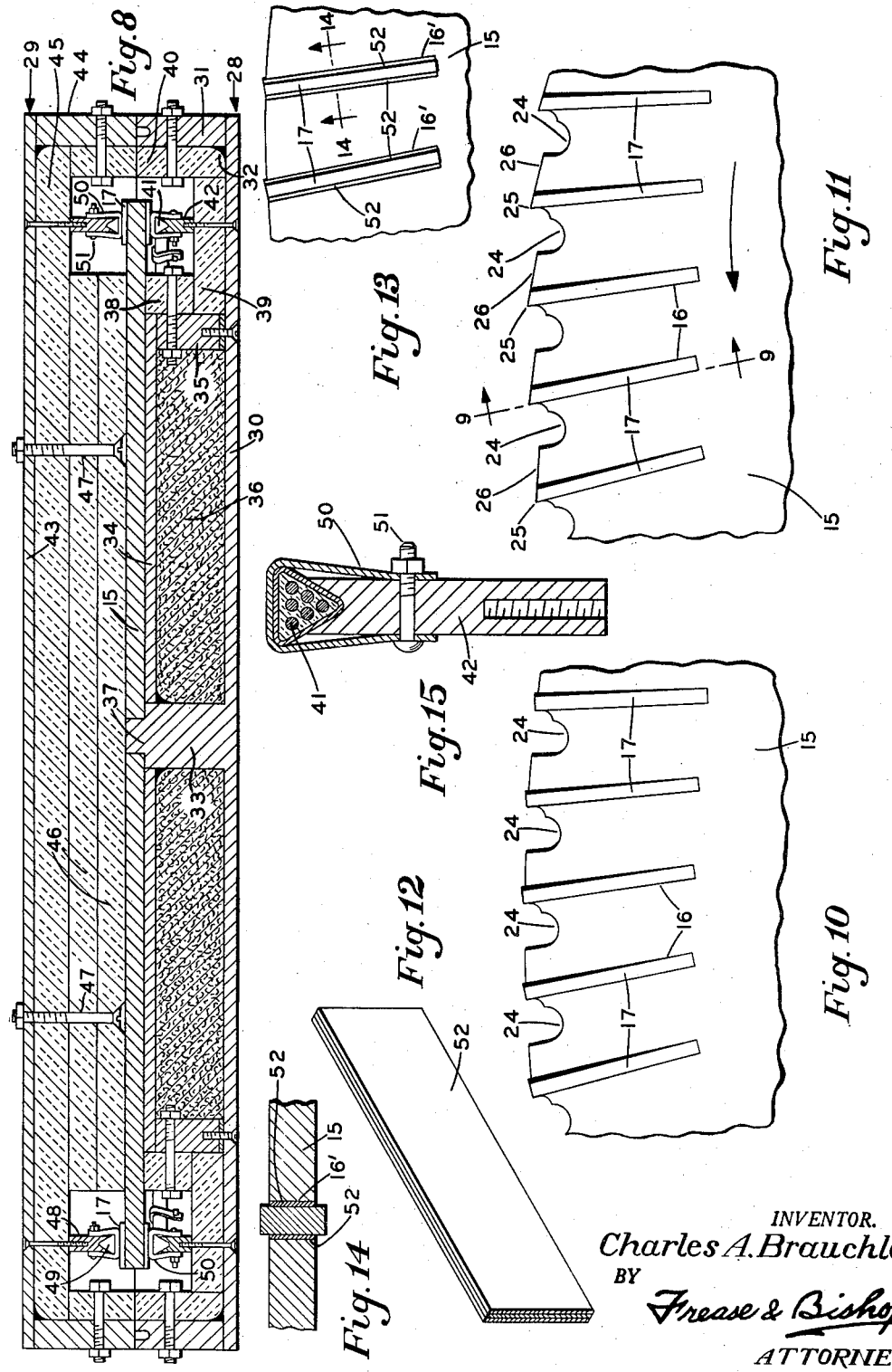

United States Patent Office 2,830,474
Patented Apr. 15, 1958

2,830,474

METHOD OF MAKING AN INSERTED TOOTH CIRCULAR SAW BLADE

Charles A. Brauchler, Canton, Ohio

Application June 14, 1954, Serial No. 436,383

4 Claims. (Cl. 76—112)

The invention relates to circular saw blades especially adapted for sawing metals and similar hard materials, and more particularly to such a saw blade having inserted teeth formed of a material considerably harder than the metal blade.

It is an object of the invention to provide a circular saw blade comprising a steel disc having slots in its peripheral portion and inserts of an exceedingly hard material located in said slots and providing cutting teeth upon the saw blades.

Another object is to provide such a saw blade in which the hard tooth inserts are brazed in the slots in the blade.

A further object is to provide a saw blade of this character in which the tooth inserts are located in tangential slots in the periphery of the blade so that the outer ends of said inserts are inclined forwardly in the direction of rotation of the blade.

A still further object is to provide a circular saw blade having teeth formed of inserts of carboloy, or other high speed cutting steels or alloys.

Another object of the invention is to provide such a saw blade in which substantially half-round cut-outs are formed in the periphery of the blade at the forward sides of the inserts.

A further object is to provide a circular saw blade of this type in which the peripheral edge of the blade is inclined rearwardly and inwardly from each tooth insert.

Still further objects provide for the manufacture of a circular saw blade of the character referred to.

The above objects together with others which will be apparent from the drawings and following description, or which may be later referred to, may be attained by constructing the improved circular saw blade in the manner hereinafter described in detail and illustrated in the accompanying drawings, in which;

Fig. 1 is a side elevation of a portion of a steel disc from which the improved circular saw blade is formed, showing the slots in the peripheral portion thereof comprising the first step in the manufacture of the blade;

Fig. 2 a detached, perspective view of a high speed steel or alloy insert;

Fig. 3 a detached, perspective view of a modified form of high speed steel or alloy insert;

Fig. 4 a detached, perspective view of a substantially hairpin shape copper, brass or silver wire which may be used for brazing the inserts in the slots of the saw blade;

Fig. 5 an enlarged, fragmentary elevation of a portion of a steel disc with the inserts placed in the peripheral slots of the disc and the copper, brass or silver wires positioned for brazing;

Fig. 6 a section on the line 6—6, Fig. 5;

Fig. 7 a section on the line 7—7, Fig. 5;

Fig. 8 a vertical, sectional view through a brazing or soldering oven with a steel disc therein with the inserts located in the slots thereof and the brazing material positioned for brazing;

Fig. 9 a section on the line 9—9, Fig. 11, showing the manner in which the edges of the inserts are tapered inwardly at each side of the saw blade;

Fig. 10 a fragmentary elevation of a portion of a partly completed saw blade;

Fig. 11 a similar view of a finished saw blade;

Fig. 12 a greatly enlarged, fragmentary perspective view of a piece of tri-metal or so-called "sandwich" ribbon of brazing material which may be used for brazing the inserts in the saw blade;

Fig. 13 a fragmentary elevation of a portion of a steel disc with the inserts placed in the peripheral slots of the disc and tri-metal or "sandwich" ribbon of brazing material located in the slots on each side of each insert;

Fig. 14 an enlarged, fragmentary section, taken on the line 14—14, Fig. 13; and, Fig. 15 an enlarged, cross-sectional view through the electric heating element used in the soldering or brazing oven shown in Fig. 8.

In the manufacture of circular saw blades for cutting metal and similar hard materials, it is customary to form the blade from a disc of relatively soft steel to the peripheral portion of which are riveted segments of hardened steel or alloy in which the teeth are formed.

In the manufacture of the improved circular saw blade to which the invention pertains, the saw blade is formed of a disc of relatively soft steel having equally spaced slots in its peripheral portion within which are brazed inserts of high speed cutting steel or alloy which may be an exceedingly hard alloy such as a tungsten-carbon-cobalt alloy known to the trade as carboloy.

Instead of being located radially upon the saw blade, as is common with the teeth upon circular saws such as are commonly in use, the slots in which these hard alloy inserts are mounted are tangentially disposed so that the outer or cutting ends of the inserts are disposed forwardly in the direction of rotation of the saw blade.

Referring now more particularly to the invention as illustrated in the drawings, in which similar numerals refer to similar parts throughout, in the manufacture of a saw blade embodying the invention a steel disc 15 of desired diameter and thickness is first produced.

A plurality of equally spaced slots 16 are then machined entirely around the periphery of the disc 15, as shown in Fig. 1. Instead of being located radially, in the manner of the teeth upon the conventional circular saw blade for cutting metal and the like, these slots are located tangentially as clearly shown in the drawings. These slots are so disposed that in the finished saw blade they will extend forwardly and outwardly in the direction of rotation of the blade.

Inserts of an extremely hard alloy, such as tungsten-carbon-cobalt alloy known to the trade as carboloy, or other high speed cutting steels or alloys, are then brazed in the slots 16 of the disc 15. These inserts may be as indicated at 17 in Fig. 2, being of a length substantially equal to the length of the slots 16, of a thickness to provide a sliding fit of the inserts into the slots, and of a width slightly greater than the thickness of the disc 15.

For the purpose of securing the inserts in the slots 16, pieces of copper, brass or silver wire, or other brazing material may be used. If desired the wire may be bent into substantially hairpin shape, as indicated at 20, and one of these wires is placed around each insert 17, upon the upper side of the disc as shown in Figs. 5 to 7, or single straight pieces of wire may be placed over each side of each insert, on the upper side of the disc.

The disc 15 with the inserts 17 located in the slots 16 thereof, may then be placed in a brazing or soldering oven and subjected to sufficient temperature to fuse the copper, brass or silver wires 20, the molten copper, brass or silver, by capillary attraction, passing down between the sides and inner ends of the inserts 17 and the walls of the slots 16, securely brazing the inserts within the slots of the disc 15.

In order to provide a clearance, the edges of the inserts 17 may then be ground upon a taper from the outer to the inner ends thereof, as indicated at 21 in Fig. 9, in which it is clearly shown that the outer end portion of each insert 17 protrudes beyond opposite sides of the disc as at 22, while the inner end of each insert is substantially the thickness of the disc 15, as indicated at 23 in Fig. 9.

If desired, instead of using a straight-sided insert 17 and then grinding the edges of the same to a taper as above described, each insert may be originally formed of the desired taper as shown at 17a in Fig. 3. These tapered inserts are placed in the slots 16 of the disc and brazed therein in the manner above described and when secured in the slots of the disc will have the same appearance as shown in Fig. 9.

The next step in the manufacture of the improved circular saw blade is to machine a cut-out portion of the shape indicated at 24, in the periphery of the disc adjacent to the forward or left side of each insert 17, as viewed in Fig. 10, in order to cause the insert teeth to cut rounded or curled chips in operation.

The final step in the manufacture of the improved circular saw blade is to grind the periphery thereof rearwardly and inwardly, from the cutting edge 25 of each insert tooth to the next adjacent cut-out portion 24 in the periphery of the disc, as indicated at 26 in Fig. 11. In this figure is shown a fragment of the peripheral portion of the finished saw blade which is adapted to be rotated counter clockwise or in the direction of the arrow shown in said figure.

It will be seen that the exceedingly hard inserts 17 which form the cutting teeth of the saw blade are inclined outwardly and forwardly in the direction of rotation of the saw blade. These inserts being tapered inwardly on each side of the disc or saw blade provide a clearance, and the peripheral portion of the disc being inclined forwardly and rearwardly from the cutting edge of each tooth to the next adjacent cut-out portion 24 provide a clearance for small chips of metal cut from the work during the operation of the saw blade.

In Figs. 8 and 15 is shown a preferred type of oven for use in brazing the inserts in the slots of the disc. This oven is formed in two separable halves comprising the lower section 28 and the movable upper section 29. The lower section of the oven comprises the circular metal bottom plate 30, and the annular side wall 31, welded or otherwise attached to the periphery thereof as indicated at 32.

A center post 33 is formed upon or fixed to the bottom plate and the supporting plate 34 is welded or otherwise secured at its center to said post, and the peripheral portion of the support plate is supported upon the annular partition wall 35. The space between the bottom plate, support plate and annular wall 35 is filled with heat and cold insulation, preferably in granular form as indicated at 36.

The upper end of the center post 33 is reduced in dimeter as shown at 37, to receive the center hole of the disc 15 and center the disc upon the support plate 34, with the peripheral portion of the disc, in which the inserts are located, extending beyond the annular partition wall 35 and the insulation 38 surrounding said annular wall.

The remainder of the bottom plate 30 is insulated as by an asbestos sheet or board 39, and the interior of the annular side wall 31 is lined with asbestos or other suitable insulation material, as indicated at 40. An annular electric heating element 41 is mounted upon an annular metal ring 42, supported upon the bottom plate, and positioned to be located adjacent to the inserts 17 in the peripheral portion of the disc 15.

The removable upper section of the soldering or brazing oven comprises a top plate 43 and depending annular side wall 44 attached to the periphery thereof. The top plate is lined with asbestos 45, and additional circular sheets 46 of asbestos are attached to the top plate, as by bolts 47, and extend downward so as to substantially contact the disc 15 when the sections of the oven are in closed position as shown in Fig. 8.

Beyond the periphery of the insulation 46, a ring 48 depends from the top plate and supports an annular electric heating element 49, similar to the element 41, and positioned to substantially contact the inserts 17 in the disc 15. The electric heating elements 41 and 49 are attached to their respective supporting rings at intervals, by metal straps 50 and bolts 51.

Instead of fitting the inserts fairly tightly into the slots of the disc, as above described, the slots may be of greater thickness than the inserts, as shown at 16' in Figs. 13 and 14, so that a flat ribbon or tape 52 of brazing material may be inserted therein on each side of the insert 17.

As shown in Fig. 12, this ribbon may be a tri-metal, or "sandwich" of different materials, such as a center layer of copper and outer layers of silver, or other desired combinations of brazing materials.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The manufacture of circular saw blades which consists in providing a steel disc of suitable thickness and of the diameter desired, cutting an equally spaced plurality of tangential slots in the peripheral portion of the disc, placing alloy inserts of greater width than the thickness of said disc in said slots, supporting the disc in horizontal position, locating brazing material wires around the inserts on the upper side of the disc, heating the brazing wires to melting temperature whereby the fused copper by capillary attraction flows down between the sides of the inserts and the walls of the slots, forming substantially half-round cutouts in the periphery of the disc on the forward sides of the inserts, and grinding the peripheral portion of the disc upon an incline inwardly and rearwardly from the outer end of each insert to the next adjacent half-round cut-out.

2. The manufacture of circular saw blades which consists in providing a steel disc of suitable thickness and of the diameter desired, cutting an equally spaced plurality of tangential slots in the peripheral portion of the disc, placing alloy inserts, of less thickness than the slots, in said slots, placing strips of tri-metal brazing ribbon in the slots on each side of the inserts, heating the brazing ribbon to melting temperature to braze the inserts in the slots, forming substantially half-round cut-outs in the periphery of the disc on the forward sides of the inserts, and grinding the peripheral portion of the disc on an incline inwardly from the outer end of each insert to the next adjacent half-round cut-out.

3. The manufacture of circular saw blades which consists in providing a steel disc of suitable thickness and of the diameter desired, cutting an equally spaced plurality of tangential slots in the peripheral portion of the disc, placing alloy inserts of a length equal to said slots and of greater width than the thickness of said disc in said slots, supporting the disc in horizontal position, locating brazing material wires around the inserts on the upper side of the disc, heating the brazing wires to melting temperature whereby the fused copper by capillary attraction flows down between the sides of the inserts and the walls of the slots, forming substantially half-round cut-outs of considerably less depth than said slots in the periphery of the disc on the forward sides of the inserts, and grinding the peripheral portion of the disc upon an incline inwardly and rearwardly from the outer end of each insert to the next adjacent half-round cut-out.

4. The manufacture of circular saw blades which consists in providing a steel disc of suitable thickness and of the diameter desired, cutting an equally spaced plurality of tangential slots in the peripheral portion of the disc, placing alloy inserts of a length equal to said slots and of less thickness than the slots, in said slots, placing strips of tri-metal brazing ribbon in the slots on each side of the inserts, heating the brazing ribbon to melting temperature to braze the inserts in the slots, forming substantially half-round cut-outs of considerably less depth than said slots in the periphery of the disc on the forward sides of the inserts, and grinding the peripheral portion of the disc on an incline inwardly from the outer end of each insert to the next adjacent half-round cut-out.

References Cited in the file of this patent

UNITED STATES PATENTS

| | | |
|---|---|---|
| 1,205,630 | Hoglund | Nov. 21, 1916 |
| 1,837,344 | Stauder | Dec. 22, 1931 |
| 1,945,535 | Schiltz | Feb. 6, 1934 |
| 2,415,271 | Baumann | Feb. 4, 1947 |
| 2,476,749 | Marsh | July 19, 1949 |
| 2,659,397 | Drake | Nov. 17, 1953 |